(12) United States Patent
Hayman

(10) Patent No.: US 7,886,616 B1
(45) Date of Patent: Feb. 15, 2011

(54) IN-LINE FLOW METER

(75) Inventor: Robert W. Hayman, Elizabeth City, NC (US)

(73) Assignee: Hoffer Flow Controls, Inc., Elizabeth City, NC (US)

( * ) Notice: Subject to any disclaimer, the term of this patent is extended or adjusted under 35 U.S.C. 154(b) by 0 days.

(21) Appl. No.: 12/590,994

(22) Filed: Nov. 17, 2009

(51) Int. Cl.
*G01F 15/06* (2006.01)

(52) U.S. Cl. .................................................. 73/861.78

(58) Field of Classification Search .............. 73/861.79, 73/861.78; 164/122.2; 210/87
See application file for complete search history.

(56) References Cited

U.S. PATENT DOCUMENTS

| | | | |
|---|---|---|---|
| 2,574,198 A | | 11/1951 | Stevenson |
| 3,182,504 A | | 5/1965 | Rittenhouse et al. |
| 4,848,164 A | | 7/1989 | Quarve et al. |
| 5,365,793 A | | 11/1994 | Terrel et al. |
| 5,607,007 A | * | 3/1997 | Chandley ................ 164/122.2 |
| 5,655,403 A | | 8/1997 | Topliff |
| 5,861,556 A | | 1/1999 | Nukui et al. |
| 5,877,430 A | | 3/1999 | Peace et al. |
| 6,149,801 A | * | 11/2000 | Giordano et al. .............. 210/87 |
| 6,220,103 B1 | | 4/2001 | Miller et al. |
| 7,475,586 B2 | | 1/2009 | Swanek |
| 2004/0250629 A1 | | 12/2004 | Turner et al. |
| 2007/0157738 A1 | | 7/2007 | Hughes et al. |
| 2009/0013806 A1 | | 1/2009 | Miller et al. |
| 2009/0126502 A1 | | 5/2009 | Wee et al. |

OTHER PUBLICATIONS

*Renewed Interest in Modified Transepithelial Laser Ablation*; Robert W. Hayman; Ocular Surgery News; vol. 22, No. 14, Jul. 15, 2004.

* cited by examiner

*Primary Examiner*—Jewel Thompson
(74) *Attorney, Agent, or Firm*—Wooten & Shaddock, PLC

(57) ABSTRACT

An in-line flow meter assembly for insertion into a pipe section, including a body comprising an elongate tubular section having a cavity; a turbine assembly support extending a determined distance from the body; a turbine shaft attached or coupled to the turbine shaft connection portion; a turbine element having a plurality of rotor blades extending radially from a central hub of the turbine element; a bearing positioned on the shaft and press fit into a hub of the turbine element; a pickup coil that is able to sense rotational motion of the turbine element and convert the rotational motion into a pulsing electrical signal; a riser having a height such that when the riser is attached or coupled to the pipe section, a rotational axis of the turbine element is located in a cross sectional center of the pipe section, regardless of a diameter of the pipe section.

18 Claims, 5 Drawing Sheets

IN-LINE FLOW METER

BACKGROUND OF THE INVENTION

1. Field of the Invention

This invention relates generally to in-line flow meters. In particular, the present invention relates to systems and methods for providing an in-line flow meter that can be used in pipes having a variety of diameters.

2. Description of Related Art

Flow meters are often used to measure the flow of a fluid in a pipe. A typical flow meter includes a rotor that is mounted in a short section of pipe and mechanically connected, via one or more gears, to a revolution counter. As fluid flows in the pipe and passes by the rotor, the rotor rotates and the gears between the rotor and the revolution counter cause the counter to show the rate of flow (generally in gallons per minute or cubic feet per second) and/or the cumulative total amount of fluid that has flowed through the section of pipe.

Since the flow meter identifies a given rate of flow through a fixed area of pipe, the pipe must be flowing full for accurate results, and must generally be installed in the pipe about ten pipe diameters away from any bends, elbows, or turbulence-causing fittings upstream from the flow meter.

SUMMARY OF THE INVENTION

This invention relates generally to in-line flow meters. In particular, the present invention relates to systems and methods for providing an in-line flow meter that can be used in pipes having a variety of diameters.

In various exemplary, non-limiting embodiments, the in-line flow meter of the present invention comprises a flow metering apparatus having a flow responsive turbine element disposed in a tubular pipe section or conduit used for the transfer of liquid or gaseous fluid from one location to another. The insertable flow metering apparatus may or may not include a meter body.

The in-line flow meter of the present invention is configured so as to allow the use of a one size insertable in-line flow meter apparatus in several sizes of tubular conduits or pipe sections. The current invention is configured in such a way as to insure that the rotational axis of the turbine element is located in the cross sectional center of the conduit or tubular pipe section and not related to a particular conduit diameter. By locating the rotational axis of the turbine element in the cross sectional center of the conduit or tubular pipe section, the turbine element's angular (or rotor) surfaces will respond to the forces of fluid velocity symmetrically. Thus, the rotation of the turbine element is directly related to fluid velocity, thereby giving indication of flow rate and volume of flow media.

In certain exemplary, non-limiting embodiments, the in-line flow meter of the present invention comprises a turbine flow meter that can be inserted in pipes of varying inside diameters to measure fluid flow.

In certain exemplary, non-limiting embodiments, the in-line flow meter comprises an insertable flow meter assembly that can be calibrated in several sizes of conduits and most schedule pipes. For example if a particular unit is calibrated in a 1-inch schedule 80 pipe having a inside diameter of 0.957 inches the output signal will be related to the fluid velocity with in the conduit, with an output signal frequency (Hz) recorded at several flow rates or velocities (calibration data sheet). The insertable flow meter assembly will repeat that frequency that is related to a particular flow rate or velocity with in any 1 inch schedule 80 pipe. The same insertable flow meter assembly can be calibrated in a 2-inch schedule 5 pipe having an inside diameter of 2.245 inches or any size pipe and schedule between the two sizes. The insertable flow meter assembly will repeat the frequency that is related to a particular flow rate or velocity with in the size conduit it was calibrated.

The in-line flow meter utilizes a riser that, in certain exemplary embodiments, is substantially cylindrical in shape with a concave end formed so as to mate to the outside diameter of the conduit such that the riser can be mounted perpendicular to that conduit. The concave shape insures that the riser is aligned with the conduit both perpendicular and having the same centerline. The riser is formed so as to fit all schedules of pipe and/or tubing having the same outside diameter. The length of the riser measured from the center of the radial concave end to the opposite end is the same for all risers and pipe and/or tubing sizes.

In certain exemplary, non-limiting embodiments, the in-line flow meter comprises a complete unit, a pipe section that is generally cylindrical in shape with appropriate end connection (NPT, flanged, butt weld, or others). The pipe section having an inlet and outlet, a riser, an insertable flow meter assembly, and a flow conditioning device (i.e., a cluster of tubes) mounted within the pipe section up-stream of the inserted flow meter assembly.

In various exemplary embodiments, the in-line flow meter assembly is supplied with several calibration data sheets that are applicable to the inside diameter (flow area) of the conduit or pipe section into which the in-line flow meter assembly is to be installed.

In various exemplary embodiments, the in-line flow meter assembly is able to incorporate certain identical internal parts for multiple in-line flow meter assemblies, thereby reducing the number of spare parts that a service company or operator needs to stock. The simplified design of the in-line flow meter assembly and the ability to access and replace the internal components further reduces both parts costs and field servicing time.

Accordingly, this invention provides an improved insertion-type turbine flow meter.

This invention separately provides apparatuses, systems, and methods for measuring the flow of a fluid through a pipe.

This invention separately provides apparatuses, systems, and methods for measuring the velocity of a flow of a fluid through a pipe.

This invention separately provides apparatuses, systems, and methods for providing accumulative measurement of flow rates.

This invention separately provides a device that generates an electrical signal or disrupts a radio frequency to produce a signal related to the flow velocity of a fluid.

This invention separately provides an insert assembly and weld on riser that can be added to any applicable size straight run of pipe with minimal tooling and skill level, thus converting a run of pipe into a flow metering device.

These and other features and advantages of this invention are described in or are apparent from the following detailed description of the exemplary, nonlimiting embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF EXEMPLARY EMBODIMENTS

For simplicity and clarification, the design factors and operating principles of the in-line flow meter according to this invention are explained with reference to various exemplary embodiments of in-line flow meter according to this invention. The basic explanation of the design factors and operating principles of the in-line flow meter assembly is applicable for the understanding, design, and operation of the in-line flow meter assembly of this invention.

It should also be appreciated that, as used herein, the terms "flow meter" and "flow meter assembly" are used for basic explanation and understanding of the operation of the systems and methods of this invention. Therefore, the terms "flow meter" and "flow meter assembly" are not to be construed as limiting the systems and methods of this invention.

Furthermore, while the term "fluid" is used herein, it should be appreciated that, as used herein, the term "fluid" is used for basic explanation and understanding of the operation of the systems, methods, and apparatuses of this invention. Therefore, the term "fluid" is not to be construed as limiting the systems, methods, and apparatuses of this invention. Thus, the term "fluid" is to be understood to broadly include any and all fluids, whether in the form of a gas or liquid, or any other flow media.

Figure 1:
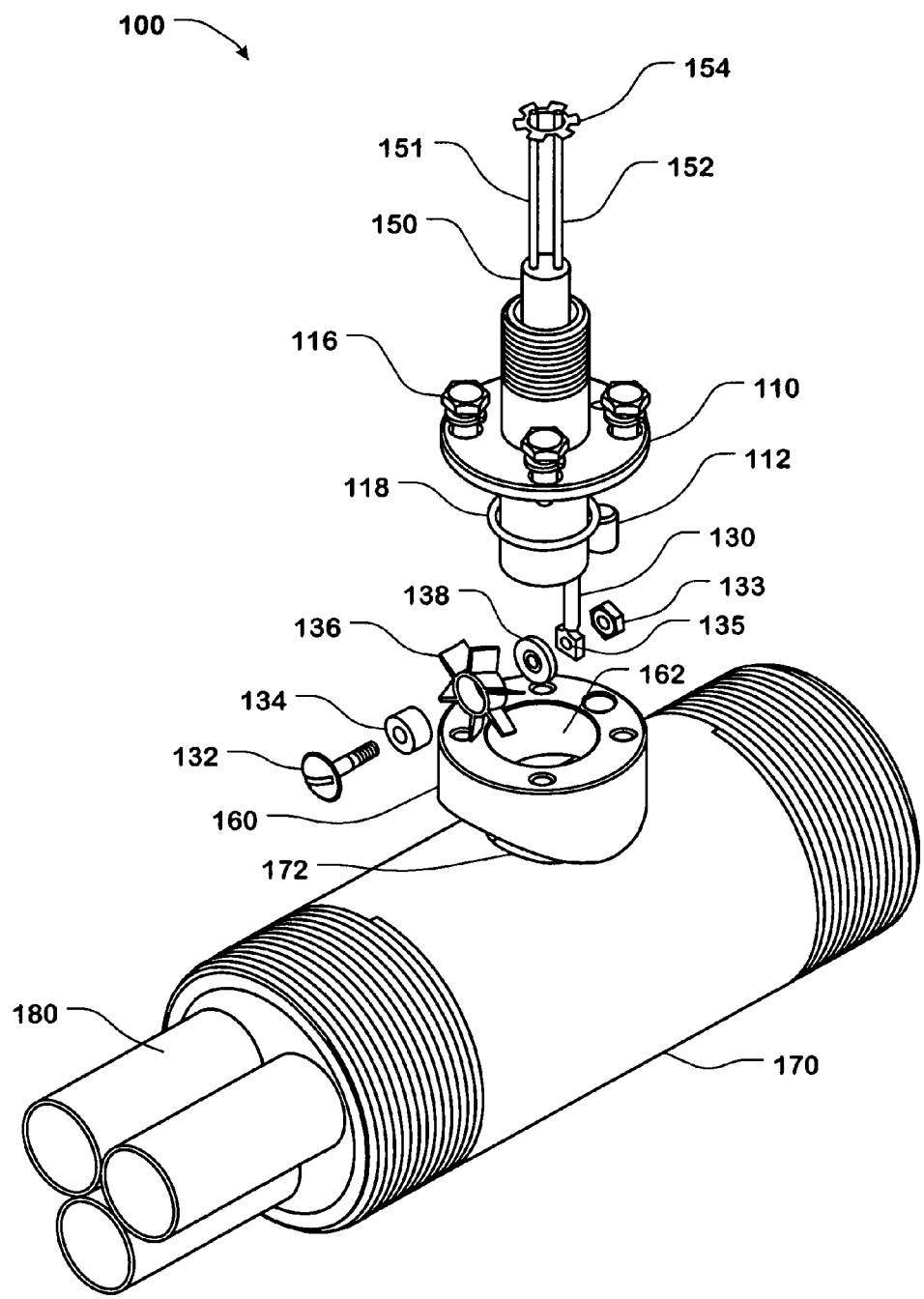
FIG. 1 shows an exploded perspective view of a first exemplary embodiment of an in-line flow meter assembly for insertion into an exemplary section of pipe, according to this invention.
Figure 2:
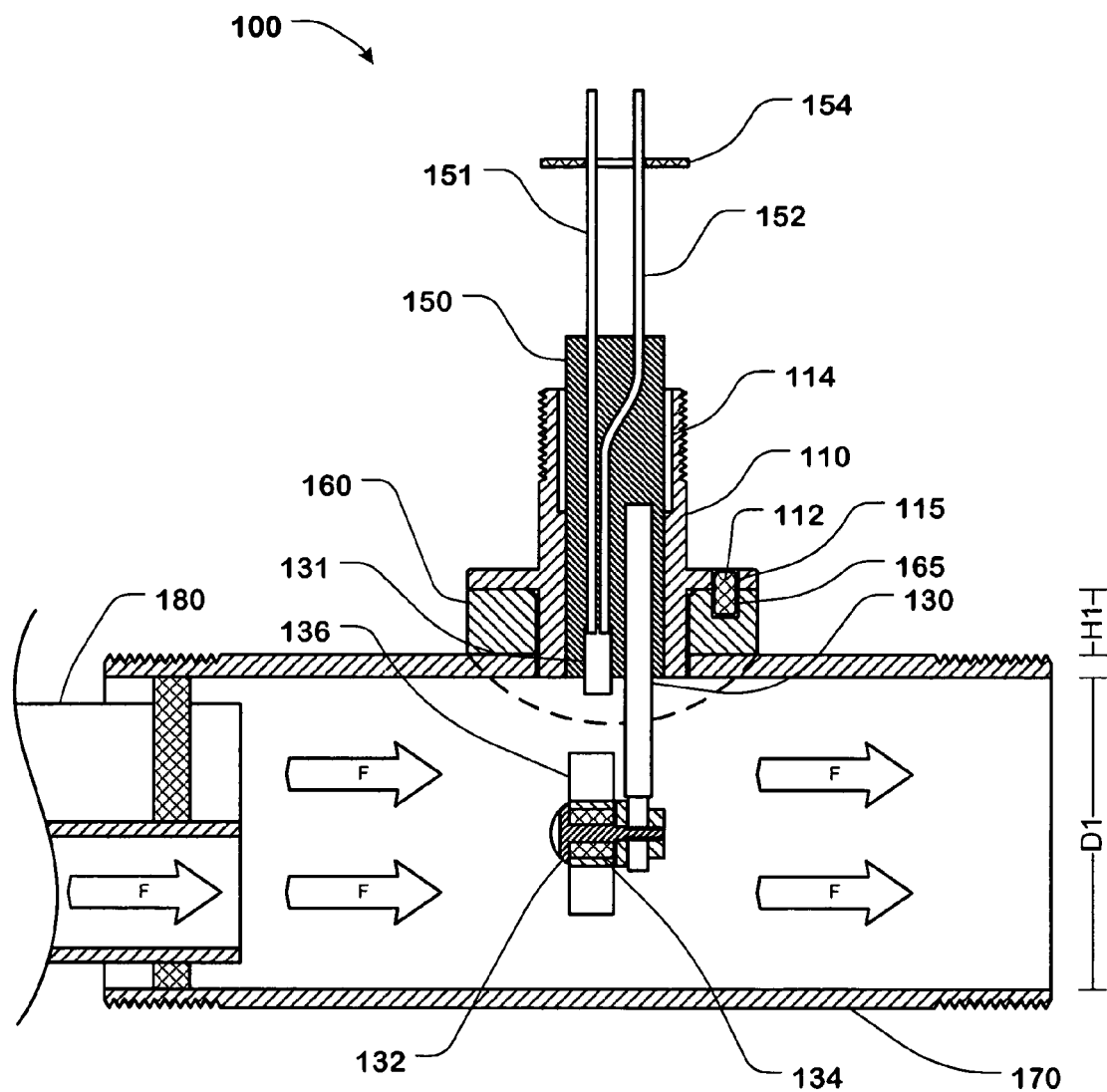
FIG. 2 shows a cross-sectional view of a first exemplary embodiment of an in-line flow meter assembly inserted into a first exemplary section of pipe, according to this invention.
Figure 3:
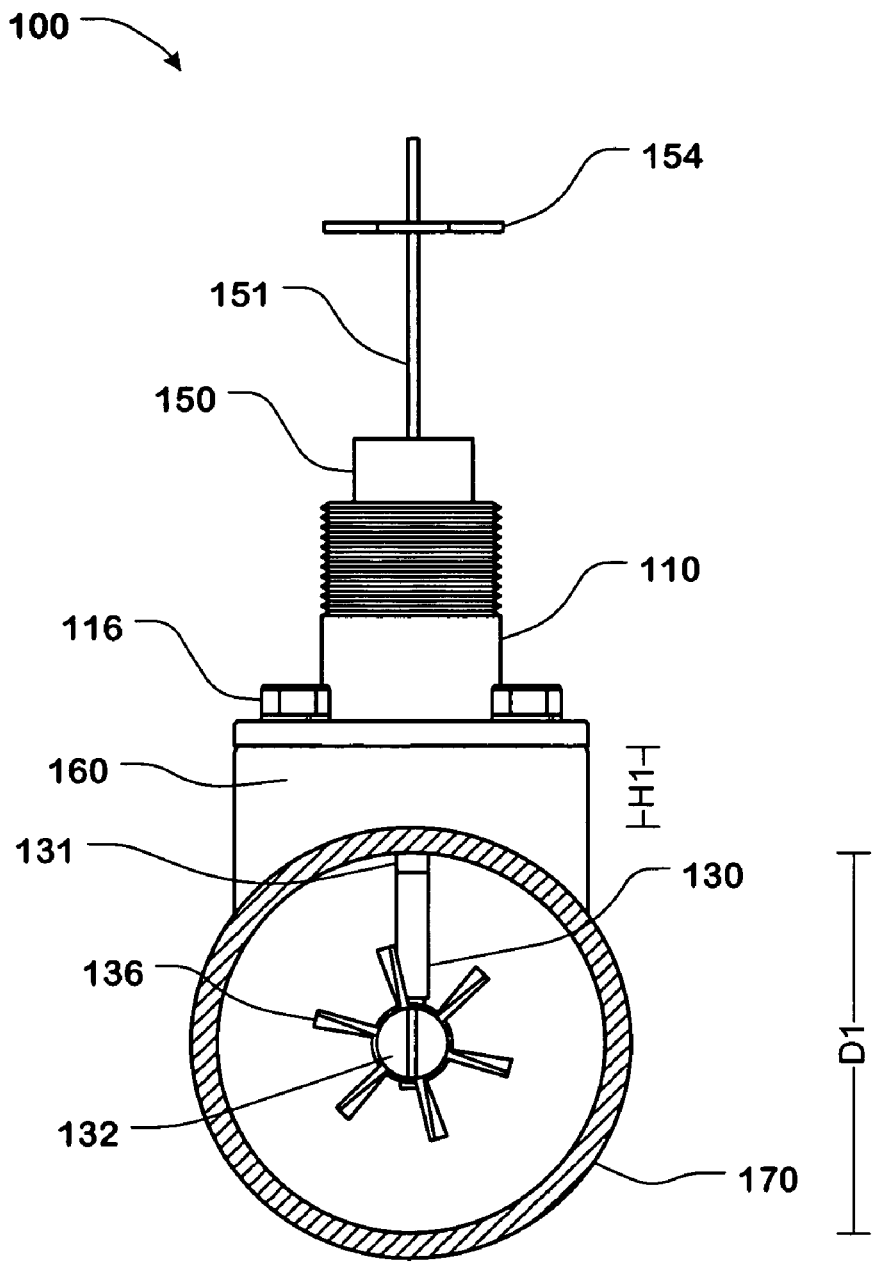
FIG. 3 shows a front view of a first exemplary embodiment of an in-line flow meter assembly inserted into a first exemplary section of pipe, according to this invention.

Turning now to the drawing Figs., FIGS. 1-3 show an exploded, cross sectional, and front view, respectively, of a first exemplary embodiment of an in-line flow meter assembly 100 for insertion into an exemplary pipe section 170, according to this invention. As shown in FIGS. 1-3, the flow meter assembly 100 includes a body 110, a turbine assembly support 130, a pickup coil 131, a flow responsive turbine element 136, and a stabilizing insert 150.

In various exemplary embodiments, the body 110 comprises a rigid structure for holding the various internal components of the in-line flow meter assembly 100. The body 110 comprises an elongate tubular section having a cavity 114 formed therein or therethrough. A flange portion extends from the tubular section and includes a plurality of attachment apertures for allowing a corresponding plurality of attachment means, such as bolt/lock washer combinations 116, to attach or couple the body 110 to an appropriate riser 160.

The stabilizing insert 150 is fitted and secured within the cavity 114 and supports the turbine assembly support 130 and the pickup coil 131 and maintains the turbine assembly support 130 and the pickup coil 131 in a fixed position relative to the body 110.

The turbine assembly support 130 extends a determined distance from the body 110 to a turbine shaft connection portion 135. When assembled, a bearing 134 is press fit into the hub of the turbine element 136, the bearing 134 is positioned on the shaft 132, and the turbine shaft 132 is attached or coupled to the turbine shaft connection portion 135 of the turbine assembly support 130. A hard carbon composite sleeve bearing 134 is optionally utilized so as to allow for compatibility with a wide variety of corrosive and non-corrosive fluids. A hard carbon composite sleeve bearing also works well in water flow applications including deionized, demineralized, and potable water. However, it should be appreciated that the bearing 134 may utilize any bearing type, including, for example, a ball bearing, a ceramic bearing, a tungsten carbide bearing, or any suitable bearing type depending upon the desired application and flow media in which the in-line flow meter assembly 100 will be utilized.

In various exemplary embodiments, the turbine shaft 132 is attached directly to the turbine shaft connection portion 135. In other exemplary embodiments, the turbine shaft 132 is coupled to the turbine shaft connection portion 135 via a jam nut 133.

A cone 138 may optionally be positioned on the turbine shaft 132 between the turbine element 136 and the turbine assembly support 130.

The turbine element 136 includes a plurality of rotor blades that extend radially from a central hub of the turbine element 136. The rotor blades are angled relative to the rotational axis of the turbine element 136 such that as a fluid flows past the turbine element 136 (parallel to the rotational axis of the turbine element 136), the force of the flowing fluid applies pressure to the angular (or rotor) surfaces of the rotor blades and causes the turbine element 136 to rotate about the bearing 134 in a desired direction.

The pickup coil 131, which is maintained in fixed position by the body 110, is positioned such that the pickup coil 131 is able to sense spinning or rotational motion of the turbine element 136 and convert the rotational motion into a pulsing electrical signal. In various exemplary embodiments, the pickup coil 131 is a magnetic pickup coil with leads 151 and 152 extending therefrom. The leads 151 and 152 allow the pickup coil 131 to interface with electronic components such as, for example, a signal conditioner, a converter, a rate indicators/totalizer, and/or a flow computer that is capable of calculating, converting, and/or displaying results based on the pulsing electrical signal received from the pickup coil 131. Summation of the pulsing electrical signal relates directly to the total flow of fluid through the pipe section 170, while the frequency is linearly related to flow rate.

In certain exemplary embodiments of the present invention, the pickup coil 131 provides an electrical pulse or signal for each pass of a rotor blade of the turbine element 136 past the pickup coil 131.

In certain exemplary embodiments, an optional retainer ring 154 may be included to help maintain the leads 151 and 152 and/or the stabilizing insert 150 in a fixed position within a pipe or tube in which a portion of the body 110 is inserted.

In order to use the in-line flow meter assembly 100, the body 110, having the internal components of the in-line flow meter assembly 100, is coupled to an appropriate riser 160. An appropriately sized "O"-ring 118 is included between the body 110 and the riser 160 so as to enhance the fluid-tight seal between the body 110 and the riser 160.

In certain exemplary embodiments, the riser 160 is substantially cylindrical in shape with a concave bottom end formed so as to mate to the outside surface of the pipe section 170 such that the riser 160 can be mounted perpendicular to the pipe section 170. The concave shape of the bottom end insures that the riser 160 is aligned with the pipe section 170 both perpendicular and having the same centerline. The riser 160 is formed so as to fit the outer surface of all schedules of pipe and/or tubing having the same outside diameter. The width of the riser 160 is the same for all risers and pipe, conduit, and/or tubing sizes, while the height H1 of the riser, as measured from an uppermost center point of the radial concave bottom portion of the riser 160 is such that when the riser 160 is attached or coupled to the section of fluid supply line or pipe section 170, the rotational axis of the turbine element 136 is located in the cross sectional center of the pipe section 170, regardless of the internal diameter of the pipe section 170. By locating the rotational axis of the turbine element 136 in the cross sectional center of the pipe section 170, the angular (or rotor) surfaces of the turbine element 136 will respond to the forces of fluid velocity symmetrically. Thus, the rotation of the turbine element 136 is directly related to fluid velocity, thereby giving indication of flow rate and volume of fluid.

The riser 160 includes an aperture 162 formed therethrough such that, when properly aligned with the pipe section 170, the riser aperture 162 is aligned with an aperture 172 formed through the pipe section 170 such that the turbine element 136 can be inserted through the apertures 162 and 172 and into the interior of the pipe section 170. In various exemplary embodiments, the riser 160 is welded to the pipe section 170. Alternatively, the riser 160 may be otherwise affixed, attached, or coupled to the pipe section 170.

The body 110 includes an alignment pin aperture 115 and the riser 160 includes a corresponding alignment pin aperture 165. The alignment pin apertures 115 and 165 can be aligned such that, when an alignment pin 112 is positioned in the alignment pin apertures 115 and 165, the rotational axis of the turbine element 136 is positioned parallel or in line with the direction of flow of the fluid within the pipe section 170 (as indicated by arrows F in FIG. 2).

An optional flow straightening section or flow conditioning device 180 may be utilized up-stream of the inserted flow meter assembly 100 to stabilize the flow of fluid and enhance the consistency of fluid flow before the fluid reaches the turbine element 136. In certain exemplary embodiments, the flow conditioning device 180 comprises a cluster of tubes mounted within the pipe section 170 up-stream of the turbine element 136 of the inserted flow meter assembly 100. In certain applications, the flow conditioning device 180 is welded into place to provide for added durability in abrasive flow applications.

During use of the in-line flow meter assembly 100, fluid passes through flow conditioning device 180, if included, which reduces the fluid's turbulent flow pattern and improves the velocity profile. The fluid then engages the rotor blades of the turbine element 136 causing the turbine element 136 to rotate at an angular velocity proportional to fluid flow rate. The pickup coil 131 senses the spinning motion of the turbine element 136 through the pipe section 170 and converts it into a pulsing electrical signal. Summation of the pulsing electrical signal relates directly to the total flow of fluid through the pipe section 170, while the frequency is linearly related to flow rate.

Figure 4:
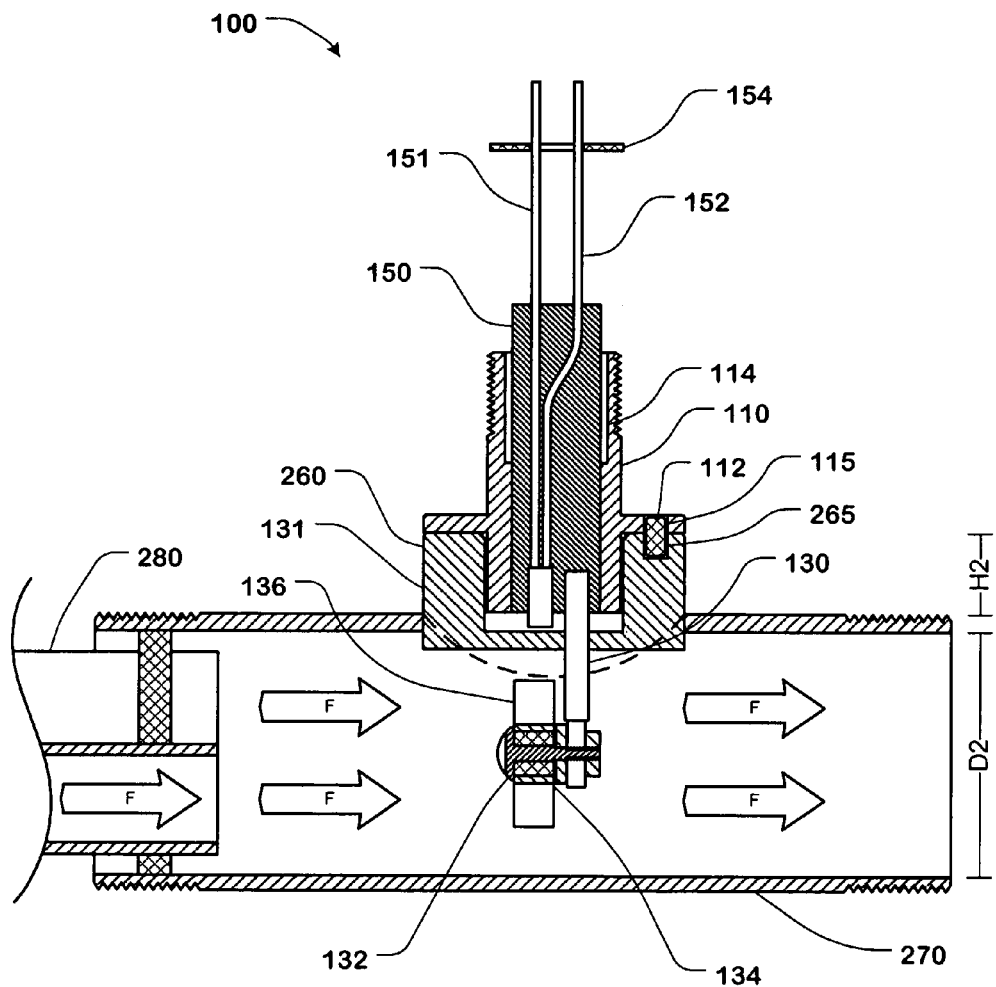
FIG. 4 shows a cross-sectional view of a first exemplary embodiment of an in-line flow meter assembly inserted into a second exemplary section of pipe, according to this invention.
Figure 5:
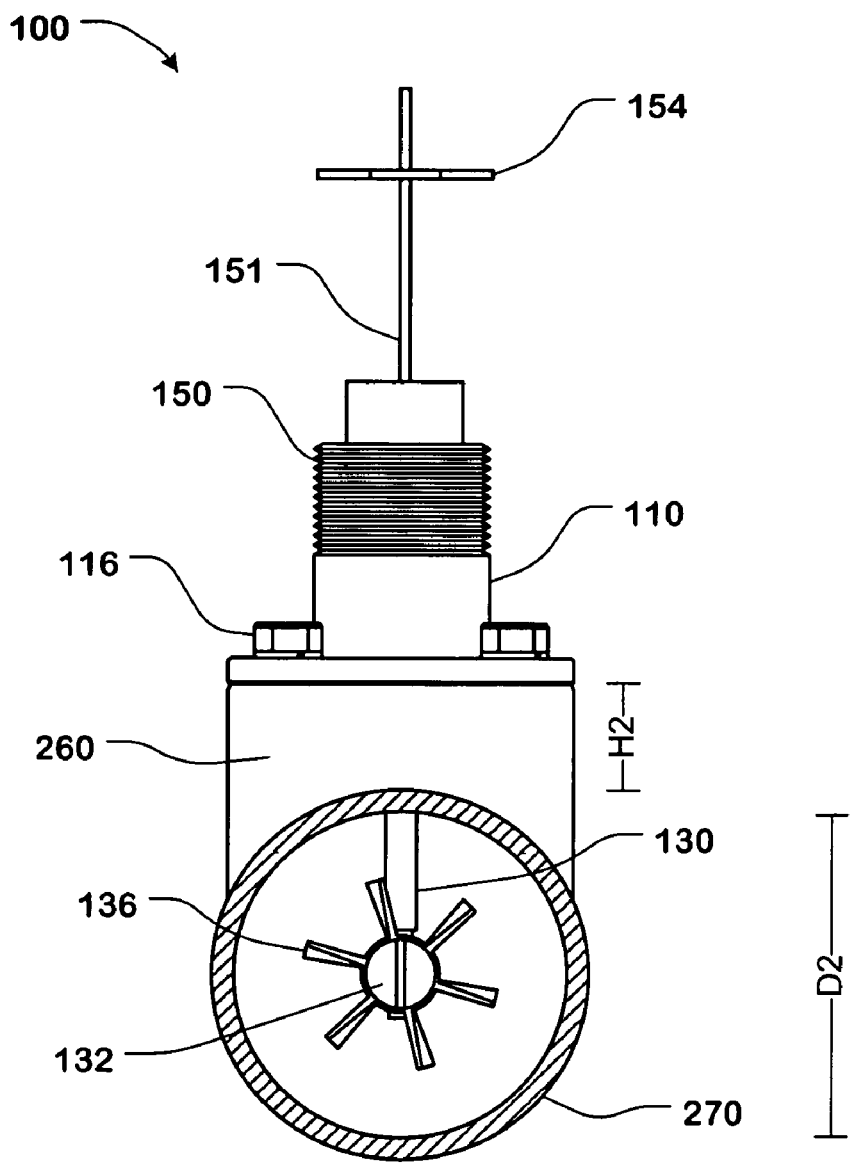
FIG. 5 shows a front view of a first exemplary embodiment of an in-line flow meter assembly inserted into a second exemplary section of pipe, according to this invention.

FIGS. 4 and 5 show a cross-sectional and a front view, respectively, of the in-line flow meter assembly 100 inserted into a second exemplary section of pipe 270, according to this invention. As show in FIGS. 4 and 5, the in-line flow meter assembly 100 is shown installed in a smaller diameter pipe section 270. As further shown FIGS. 4 and 5, the in-line flow meter assembly 100 comprises a body 110 having a cavity 114, an alignment pin 112, an alignment pin aperture 115, attachment means 116, an "O"-ring 118, a turbine assembly support 130, a pickup coil 131 having leads 151 and 152, a turbine shaft 132, an optional jam nut 133, a bearing 134, a turbine shaft connection portion 135, a turbine element 136, an cone 138, and a stabilizing insert 150. It should be understood that each of these elements corresponds to and operates as described above with reference to FIGS. 1-3.

However, as shown in FIGS. 4 and 5, the in-line flow meter assembly 100 is utilized with a section of pipe 270. The section of pipe 270 has a smaller diameter D2 as compared to the diameter D1 of the section of pipe 170 as described above with reference to FIGS. 1-3. For example, the diameter D1 may be 2 inches, while the diameter D2 may be one and one half or one inch.

To accommodate the section of pipe 270 having the diameter D2, the riser 260 has a height of H2, as measured from the uppermost center point of the radial concave bottom portion of the riser 260 is such that when the riser 260 is attached or coupled to the section of fluid supply line or pipe section 270, the rotational axis of the turbine element 136 is located in the cross sectional center of the pipe section 270, despite the reduced diameter D2 of the pipe section 270, as compared to the diameter D1 of the pipe section 170.

The alignment pin aperture 115 of the body 110 is capable of being aligned with the alignment pin aperture 265 of the riser 260 such that, when an alignment pin 112 is positioned in the alignment pin apertures 115 and 265, the rotational axis of the turbine element 136 is positioned in line with the direction of flow of the fluid within the pipe section 270 (as indicated by arrows F in FIG. 4).

An optional flow conditioning device 280, similar to the flow conditioning device 180 may be utilized up-stream of the inserted flow meter assembly 100 to stabilize the flow of fluid and enhance the consistency of fluid flow before the fluid reaches the turbine element 136.

While this invention has been described in conjunction with the exemplary embodiments outlined above it is evident that many alternatives, modifications, and variations will be apparent to those skilled in the art. Such adaptations and modifications should and are intended to be comprehended within the meaning and range of equivalents of the disclosed exemplary embodiments. For example, it should be appreciated that in certain embodiments the in-line flow meter assembly comprises an insertable in-line flow meter assembly and a riser for use in a section of pipe. Alternatively, the in-line flow an insertable in-line flow meter assembly and a riser attached to a discrete portion of pipe.

It is to be understood that the phraseology of terminology employed herein is for the purpose of description and not limitation. Accordingly, the forgoing description of the exemplary embodiments of the invention, as set forth above are intended to be illustrative, not limiting and the fundamental design should not be considered to be necessarily so constrained. Various changes, modifications, and/or adaptations may be made without departing from the spirit and scope of this invention.

What is claimed is:

1. An in-line flow meter assembly for insertion into a pipe section, comprising:
   a body comprising an elongate tubular section having a cavity formed therethrough, and further comprising a flange portion extending from the tubular section, wherein the tubular section includes a plurality of attachment apertures for allowing a corresponding plurality of attachment means to attach or couple the body to a riser;

a turbine assembly support maintained in a fixed position relative to the body, and extending a determined distance from the body to a turbine shaft connection portion;

a turbine shaft attached or coupled to the turbine shaft connection portion and extending from the turbine shaft connection portion;

a bearing positioned on the shaft;

a flow responsive turbine element having the bearing positioned within a hub of the turbine element, wherein the turbine element includes a plurality of rotor blades extending radially from a central hub of the turbine element, and wherein surfaces of the rotor blades are angled relative to the rotational axis of the turbine element such that as a fluid flows past the turbine element, the force of the flowing fluid applies pressure to the angular surfaces of the rotor blades and causes the turbine element to rotate about the bearing;

a pickup coil, wherein the pickup coil is maintained in fixed position by the body, wherein the pickup coil is positioned such that the pickup coil is able to sense rotational motion of the turbine element and convert the rotational motion into a pulsing electrical signal, and wherein the pickup coil includes leads extending therefrom that allow the pickup coil to interface with certain electronic components;

a riser having an aperture formed therethrough such that, when aligned with the pipe section, the riser aperture is aligned with an aperture formed through the pipe section such that the turbine element is positioned within an interior of the pipe section, wherein the riser has a height such that when the riser is attached or coupled to the pipe section, a rotational axis of the turbine element is located in a cross sectional center of the pipe section, regardless of a diameter of the pipe section.

2. The in-line flow meter assembly of claim 1, wherein each attachment means comprises a bolt/lock washer combination.

3. The in-line flow meter assembly of claim 1, wherein the bearing is a hard carbon composite sleeve bearing, a ball bearing, a ceramic bearing, a tungsten carbide bearing, or an equivalent.

4. The in-line flow meter assembly of claim 1, wherein the turbine shaft is attached directly to the turbine shaft connection portion.

5. The in-line flow meter assembly of claim 1, wherein the turbine shaft is coupled to the turbine shaft connection portion via a jam nut.

6. The in-line flow meter assembly of claim 1, wherein a cone is positioned on the turbine shaft, between the turbine element and the turbine assembly support.

7. The in-line flow meter assembly of claim 1, further comprising a stabilizing insert fitted and secured within the cavity, wherein the stabilizing insert supports the turbine assembly support and the pickup coil and maintains the turbine assembly support and the pickup coil in a fixed position relative to the body.

8. The in-line flow meter assembly of claim 1, wherein the pickup coil is a magnetic pickup coil.

9. The in-line flow meter assembly of claim 1, wherein the pickup coil provides an electrical pulse for each pass of a rotor blade of the turbine element past the pickup coil.

10. The in-line flow meter assembly of claim 1, wherein the certain electronic components comprise a flow computer for at least calculating the flow of fluid through the pipe section based on the pulsing electrical signal received from the pickup coil.

11. The in-line flow meter assembly of claim 1, wherein the riser is welded to the pipe section.

12. The in-line flow meter assembly of claim 1, wherein the riser is affixed, attached, or coupled to the pipe section.

13. The in-line flow meter assembly of claim 1, wherein the riser is substantially cylindrical in shape with a concave bottom end formed so as to mate to an outside surface of the pipe section such that the riser can be mounted perpendicular to the pipe section.

14. The in-line flow meter assembly of claim 1, wherein the body includes an alignment pin aperture and the riser includes a corresponding alignment pin aperture, such that the alignment pin aperture of the body can be aligned with the alignment pin aperture of the riser and an alignment pin can be positioned in the alignment pin apertures, the rotational axis of the turbine element is positioned in line with the direction of flow of fluid within the pipe section.

15. The in-line flow meter assembly of claim 1, further comprises a flow conditioning device positioned within the pipe section up-stream of the flow meter assembly.

16. The in-line flow meter assembly of claim 15, wherein the flow conditioning device comprises a cluster of tubes mounted within the pipe section.

17. An in-line flow meter assembly, comprising:

a pipe section;

a body comprising an elongate tubular section having a cavity formed therethrough, and further comprising a flange portion extending from the tubular section, wherein the tubular section includes a plurality of attachment apertures for allowing a corresponding plurality of attachment means to attach or couple the body to a riser;

a turbine assembly support maintained in a fixed position relative to the body, and extending a determined distance from the body to a turbine shaft connection portion;

a turbine shaft attached or coupled to the turbine shaft connection portion and extending from the turbine shaft connection portion;

a bearing positioned on the shaft;

a flow responsive turbine element having the bearing positioned within a hub of the turbine element, wherein the turbine element includes a plurality of rotor blades extending radially from a central hub of the turbine element, and wherein surfaces of the rotor blades are angled relative to the rotational axis of the turbine element such that as a fluid flows past the turbine element, the force of the flowing fluid applies pressure to the angular surfaces of the rotor blades and causes the turbine element to rotate about the bearing;

a pickup coil, wherein the pickup coil is maintained in fixed position by the body, wherein the pickup coil is positioned such that the pickup coil is able to sense rotational motion of the turbine element and convert the rotational motion into a pulsing electrical signal, and wherein the pickup coil includes leads extending therefrom that allow the pickup coil to interface with certain electronic components;

a riser having an aperture formed therethrough such that, when aligned with the pipe section, the riser aperture is aligned with an aperture formed through the pipe section such that the turbine element is positioned within an interior of the pipe section, wherein the riser has a height such that when the riser is attached or coupled to the pipe section, a rotational axis of the turbine element is located in a cross sectional center of the pipe section, regardless of a diameter of the pipe section.

18. An in-line flow meter assembly for insertion into a pipe section, including a body comprising an elongate tubular section having a cavity;
- a turbine assembly support extending a determined distance from the body;
- a turbine shaft attached or coupled to the turbine shaft connection portion;
- a turbine element having a plurality of rotor blades extending radially from a central hub of the turbine element;
- a bearing positioned on the shaft and press fit into a hub of the turbine element;
- a pickup coil that is able to sense rotational motion of the turbine element and convert the rotational motion into a pulsing electrical signal; and
- a riser having a height such that when the riser is attached or coupled to the pipe section, a rotational axis of the turbine element is located in a cross sectional center of the pipe section, regardless of a diameter of the pipe section.

* * * * *